US012542679B2

(12) United States Patent
Altman et al.

(10) Patent No.: US 12,542,679 B2
(45) Date of Patent: Feb. 3, 2026

(54) SYSTEM AND METHOD FOR MANAGING VIRTUAL SIGNATURES AND ELECTRONIC DOCUMENTS

(71) Applicant: DOXLY, INC., Indianapolis, IN (US)

(72) Inventors: Haley Altman, Indianapolis, IN (US); Moses Dwaram, Indiapolis, IN (US); Darrell Poole, Indianapolis, IN (US); Long Ma, Indianapolis, IN (US); Douglas Wilson, Indianapolis, IN (US)

(73) Assignee: DOXLY, INC., Indianapolis, IN (US)

( * ) Notice: Subject to any disclaimer, the term of this patent is extended or adjusted under 35 U.S.C. 154(b) by 830 days.

(21) Appl. No.: 15/922,677

(22) Filed: Mar. 15, 2018

(65) Prior Publication Data

US 2018/0270070 A1 Sep. 20, 2018

Related U.S. Application Data

(60) Provisional application No. 62/471,594, filed on Mar. 15, 2017.

(51) Int. Cl.
*H04L 9/32* (2006.01)
*G06Q 50/18* (2012.01)

(52) U.S. Cl.
CPC ......... *H04L 9/3247* (2013.01); *G06Q 50/188* (2013.01)

(58) Field of Classification Search
CPC ............................ H04L 9/3247; G06Q 50/188
USPC ............................................................ 705/50
See application file for complete search history.

(56) References Cited

U.S. PATENT DOCUMENTS

| | | | | |
|---|---|---|---|---|
| 6,305,716 | B1 * | 10/2001 | Warther | B42D 5/027 283/61 |
| 8,316,237 | B1 | 11/2012 | Felsher et al. | |
| 8,566,115 | B2 | 10/2013 | Moore | |
| 9,378,518 | B2 * | 6/2016 | Zank | H04L 9/3247 |
| 9,396,006 | B2 | 7/2016 | Kundu et al. | |
| 9,984,242 | B2 | 5/2018 | Follis | |
| 10,110,385 | B1 * | 10/2018 | Rush | H04L 9/3234 |
| 10,908,606 | B2 | 2/2021 | Stein et al. | |
| 2004/0181756 | A1 * | 9/2004 | Berringer | G06F 21/64 713/176 |
| 2005/0138382 | A1 * | 6/2005 | Hougaard | G06Q 10/10 713/176 |
| 2008/0016358 | A1 * | 1/2008 | Filreis | H04L 9/3247 713/176 |

(Continued)

OTHER PUBLICATIONS

Microsoft Computer Dictionary, Fifth Edition 281, 562, 574 (Microsoft Press 2002).*

*Primary Examiner* — John W Hayes
*Assistant Examiner* — Wodajo Getachew
(74) *Attorney, Agent, or Firm* — NIXON PEABODY LLP; Janet Garetto; Sorinel Cimpoes

(57) ABSTRACT

Business transactions are complex and require numerous documents to be completed. Moreover, managing signatures to every one of the documents in such transactions is also an important aspect. Traditional systems and method are not adept at handling the intricacies of complex business transactions. The disclosure herein relates to an improved system and method for managing virtual signatures and electronic documents, wherein documents are managed via an online web infrastructure, the documents are drafted, distributed, collected and verified using virtual signatures at the web infrastructure.

6 Claims, 17 Drawing Sheets

(56) References Cited

U.S. PATENT DOCUMENTS

| | | | | |
|---|---|---|---|---|
| 2008/0235577 | A1* | 9/2008 | Veluchamy | G06F 21/6209 715/268 |
| 2016/0162697 | A1* | 6/2016 | Follis | G06F 21/31 726/28 |
| 2016/0179776 | A1* | 6/2016 | Bartley | G06Q 20/027 715/268 |
| 2016/0188907 | A1* | 6/2016 | Almgren | G06F 21/64 713/176 |
| 2016/0299876 | A1* | 10/2016 | New | H04L 9/3247 |
| 2017/0083867 | A1* | 3/2017 | Saxena | G06Q 10/103 |
| 2017/0344245 | A1* | 11/2017 | Kumar | G06F 21/645 |
| 2019/0036707 | A1* | 1/2019 | Eliezer | H04L 63/0861 |

* cited by examiner

Signature Packets

RECIPIENT
Sundar Pichai
sundar@google.com

Packets
Choose a packet below to view its contents or void it.

PACKET | SENT
---|---
Signature Packet 1
4 documents, 3 signature pages | 00/00/00, 00:00 pm
Signature Packet 2
3 documents, 3 signature pages | 00/00/00, 00:00 pm
Signature Packet 3
1 document | Not sent

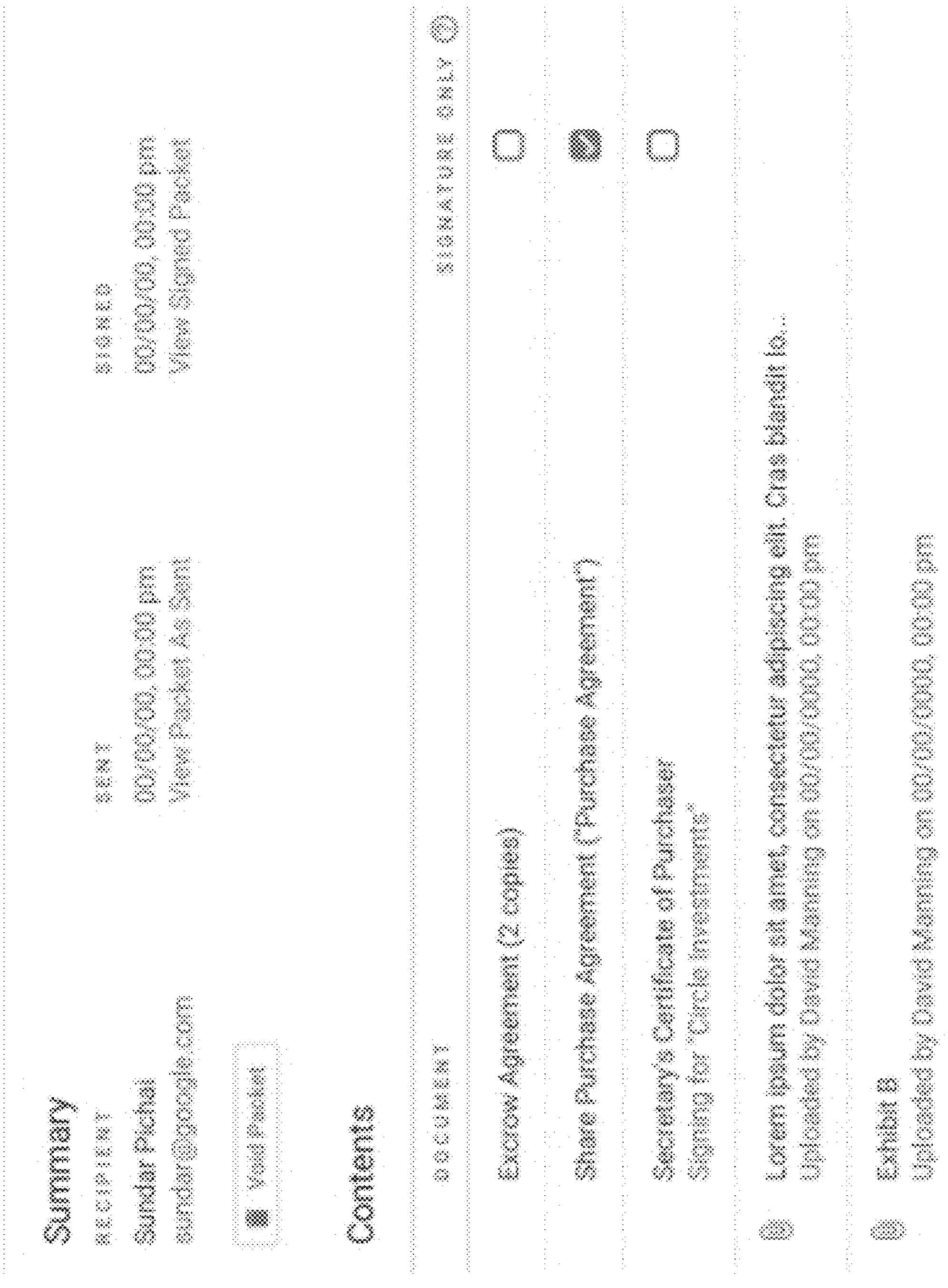

FIG. 5C

Signature Packet 1

Summary

RECIPIENT

Sundar Pichai
sundar@google.com

[View Packet]

SENT
00/00/00, 00:00 pm
View Packet As Sent

SIGNED
00/00/00, 00:00 pm
View Signed Packet

Contents

DOCUMENT | SIGNATURE ONLY

Escrow Agreement (2 copies) — ○

Share Purchase Agreement ("Purchase Agreement") — ●

Secretary's Certificate of Purchaser
Signing for "Circle Investments" — ○

● Lorem ipsum dolor sit amet, consectetur adipiscing elit. Cras blandit lo...
Uploaded by David Manning on 00/00/0000, 00:00 pm ● Exhibit B
Uploaded by David Manning on 00/00/0000, 00:00 pm

SYSTEM AND METHOD FOR MANAGING VIRTUAL SIGNATURES AND ELECTRONIC DOCUMENTS

PRIORITY

This application claims priority to U.S. Provisional Patent Application No. 62/471,594, filed Mar. 15, 2017, which application is entirely incorporated by reference herein.

TECHNICAL FIELD

The present disclosure relates in general to a system and method of document delivery and management, and, more specifically, to a new and improved system and method for managing virtual signatures and electronic documents.

BACKGROUND

Complex business transactions are routine. Along with the traditional challenges like negotiation and compromise that come with "striking a transaction," business transactions also often require the administrative overhead of reviewing, maintaining, managing, negotiating, and tracking numerous contract documents, revisions, and signatures. In such transactions, document management becomes vital and often becomes a central concern for the parties of the transaction. For example, obtaining signatures from all parties to a transaction is necessary to consummate the transaction; otherwise the transaction may be nullified or invalidated. Where business transactions are complex, managing signatures to every document in an such transactions also becomes complex. For example, there may be various parties to a transaction (e.g. a buyer, a seller, a financier, a debtor, etc.), and each of the various parties may include numerous individuals (e.g. board members of one party). The transaction may be further complicated when each of the numerous individuals may serve as signatories under different roles and responsibilities.

Therefore, managing signatures to every document is a complicated process. Signature pages will have to be crafted for every document requiring signature and each may need customization depending on which signatories (or signatory groups) need to sign and to understand how those groups are defined for signing purposes. For example, signature pages must be added for every signatory for the agreement, and each page may include a signing alias, signature block and footer. Formatting footers and ensuring that they appear on every signature page further complicates the document management process.

Another challenge is ensuring all appropriate documents are maintained correctly. Usually, a 'transaction checklist' is used to track existing documents and document management often entails the manual processing, organizing and distribution of transaction documents. Obtaining signatures requires review of the transaction checklist and confirming that all applicable parties have signed and returned transaction documents. This can become a repetitive activity when amending, recreating, and redistributing documents after changes.

Often, such rote activity requires significant time and effort, but adds minimal value to a transaction. This "administrative" work, while essential to any transaction, is not efficient or streamlined, and presents numerous points of failure that can delay or even derail a transaction.

Therefore, there is a need for an improved system and method for managing virtual signatures and electronic documents.

SUMMARY

The present disclosure relates to an improved system and method for managing virtual signatures and electronic documents. In at least one embodiment of the present disclosure, a computerized method for managing virtual signatures and electronic documents is provided. The method includes, receiving one or more transaction packets at a web infrastructure, each of the one or more transaction packets having at least one document, generating a signature document corresponding to the at least one document of the each of one or more transaction engagements, automatically generating an electronic signature block for each signature document, embedding the each electronic signature block into each signature document, creating an execution package comprising the each signature document and the at least one document of the each of one or more transaction engagements, and transmitting to a client device, the execution package to a signatory.

In at least one embodiment of the present disclosure, the method includes receiving at least one executed signature document, and verifying the at least one executed signature document based on a hash verification and the electronic signature block of the each of the executed signature documents.

In at least one embodiment of the present disclosure, the method includes tracking a status of the each of the signature documents.

In at least one embodiment of the present disclosure, the method includes configuring signature pages via the web infrastructure.

In at least one embodiment of the present disclosure, the system includes a database, and a web infrastructure, configured to receive one or more transaction packets, each of the one or more transaction packets having at least one transaction document, the web infrastructure further configured to generate a signature document based at least in part on a signatory, the signatory's signing authority, and an entity, the web infrastructure further configured to automatically generate an electronic signature block for each signature document and embed the each electronic signature block into each signature document.

DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 5C displays a screenshot of an application generated through execution of the methods described herein and/or use of the systems described herein.

DETAILED DESCRIPTION

Reference will now be made in detail to the preferred embodiments of the present disclosure, examples of which are illustrated in the accompanying drawings. Additional features and advantages of the disclosure will be set forth in the description that follows, and will be apparent from the description, or may be learned by practice of the disclosure. It is to be understood that both the foregoing general description and the following detailed description are exemplary and explanatory and are intended to provide further explanation of the disclosure as claimed.

This detailed description is presented in terms of programs, data structures or procedures executed on a computer or network of computers. The software programs implemented by the system may be written in any programming language—interpreted, compiled, or otherwise. These languages may include, but are not limited to, PHP, ASP.net, HTML, HTML5, Ruby, Perl, Java, Python, C++, C#, JavaScript, and/or the Go programming language. It should be appreciated, of course, that one of skill in the art will appreciate that other languages may be used instead, or in combination with the foregoing and that web and/or mobile application frameworks may also be used, such as, for example, Ruby on Rails, Node.js, Zend, Symfony, Revel, Django, Struts, Spring, Play, Jo, Twitter Bootstrap and others. It should further be appreciated that the systems and methods disclosed herein may be embodied in software-as-a-service available over a computer network, such as, for example, the Internet. Further, the present disclosure may enable web services, application programming interfaces and/or service-oriented architecture through one or more application programming interfaces or otherwise.

Figure 1:
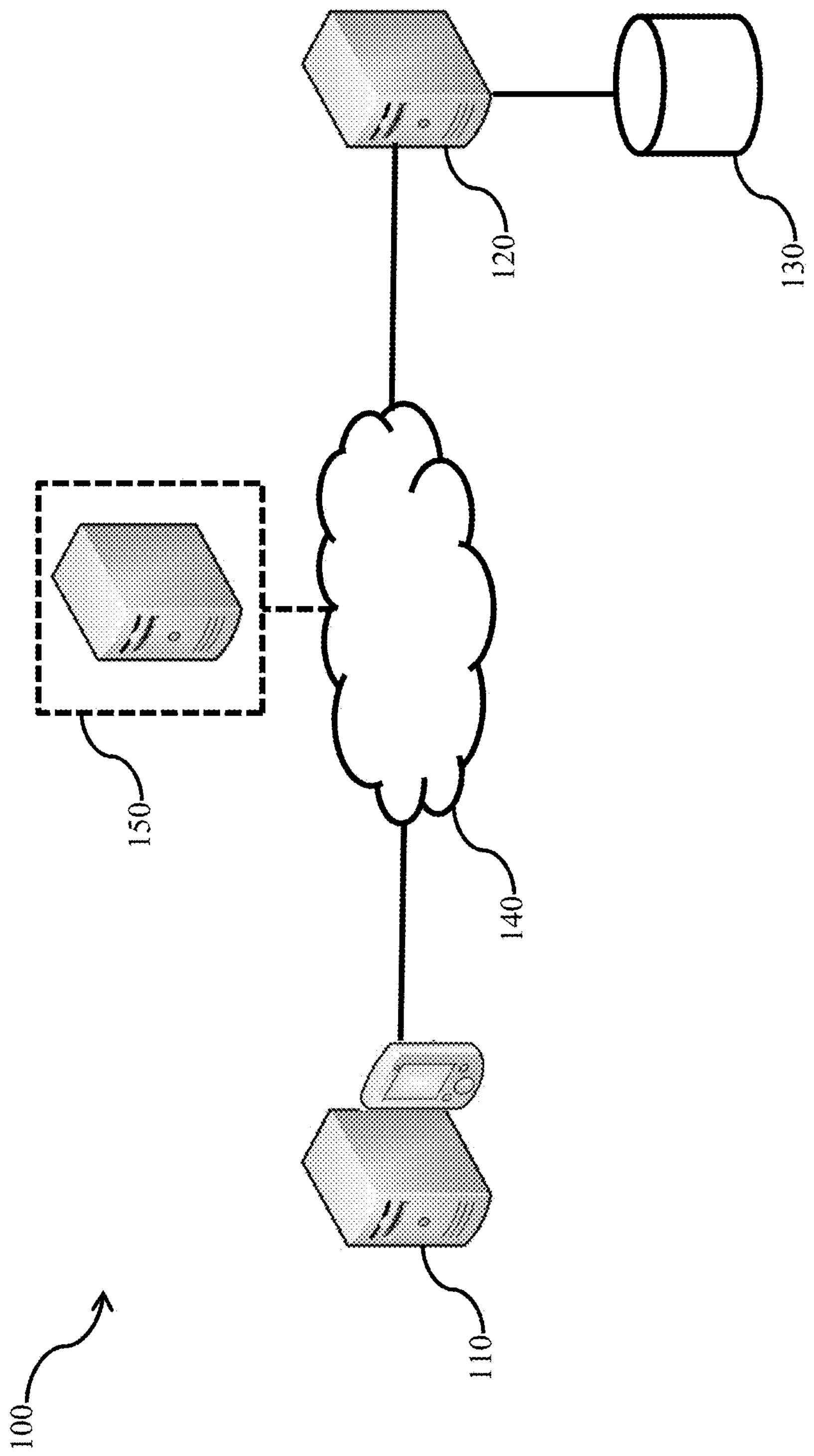
FIG. 1 shows a system for managing virtual signatures and electronic documents, according to at least one embodiment of the present disclosure.

Referring now to FIG. 1, it is shown a schematic drawing of a system 100 for managing virtual signatures and electronic documents. In at least one embodiment of present disclosure, the system 100 comprises client device 110, server 120, database 130, computer network 140, and third party database 150.

The client device 110 may be configured to transmit information to and generally interact with a web service and/or application programming interface infrastructure housed on server 120 over computer network 140. The client device 110 may include a web browser; mobile application, socket or tunnel, or other network connected software such that communication with the web services infrastructure on server 120 is possible over the computer network 140.

The client device 110 includes one or more computers, smartphones, tablets, wearable technology, computing devices, or systems of a type well known in the art, such as a mainframe computer, workstation, personal computer, laptop computer, hand-held computer, cellular telephone, MP3 player, or personal digital assistant. The client device 110 comprises such software, hardware, and componentry as would occur to one of skill in the art, such as, for example, one or more microprocessors, memory systems, input/output devices, device controllers, and the like. The client device 110 also comprises one or more data entry means (not shown in FIG. 1) operable by users of the client device 110 for data entry, such as, for example, voice or audio control, a pointing device (such as a mouse), keyboard, touchscreen, microphone, voice recognition, and/or other data entry means known in the art. The client device 110 also comprises a display means (not shown in FIG. 1) which may comprise various types of known displays such as liquid crystal diode displays, light emitting diode display, and the like upon which information may be display in a manner perceptible to the user. It will be appreciated that client device 110 may further comprise a Global Positioning System (GPS) transceiver and such software, hardware, and componentry as would occur to one of skill in the art, to operably perform the functions allocated to the client device 110 in accordance with the present disclosure.

The database 130 is configured to store information generated by the system 100 and/or retrieved from one or more information sources. In at least one embodiment of the present disclosure, database 130 can be "associated with" server 120 where, as shown in the embodiment in FIG. 1, database 130 resides on server 120. Database 130 can also be "associated with" server 120 where database 130 resides on a server or computing device remote from server 120, provided that the remote server or computing device is capable of bi-directional data transfer with server 120, such as, for example, in Amazon AWS, Rackspace, or other virtual infrastructure, or any business network. In at least one embodiment of the present disclosure, the remote server or computing device upon which database 130 resides is electronically connected to server 120 such that the remote server or computing device is capable of continuous bi-directional data transfer with server 120.

For purposes of clarity, database 130 is shown in FIG. 1, and referred to herein as a single database. It will be appreciated by those of ordinary skill in the art that database 130 may comprise a plurality of databases connected by software systems of a type well known in the art, which collectively are operable to perform the functions delegated to database 130 according to the present disclosure. Database 130 may also be part of distributed data architecture, such as, for example, a Hadoop architecture, for big data services. Database 130 may comprise relational database architecture, noSQL, OLAP, or other database architecture of a type known in the database art. Database 130 may comprise one of many well-known database management systems, such as, for example, MICROSOFT's SQL Server, MICROSOFT's ACCESS, MongoDB, Redis. Hadoop, or IBM's DB2 database management systems, or the database management systems available from ORACLE or SYBASE. Database 130 retrievably stores information that is communicated to database 130 from client device 110 or server 120.

In at least one embodiment of the present disclosure, the system 100 further includes at least one third party database 140. The third party database 140 may include one or more third party databases generally available over the Internet, such as, for example, data repositories, open access directories, public directories, and the like. It will be appreciated that the third party database 140 include demographic and identifiable data and configured to perform the functions delegated to third party database 140, as further disclosed herein. It will be further appreciated that third party database 140 may be accessed via a third party application programming interface (API) (not shown).

Figure 2:
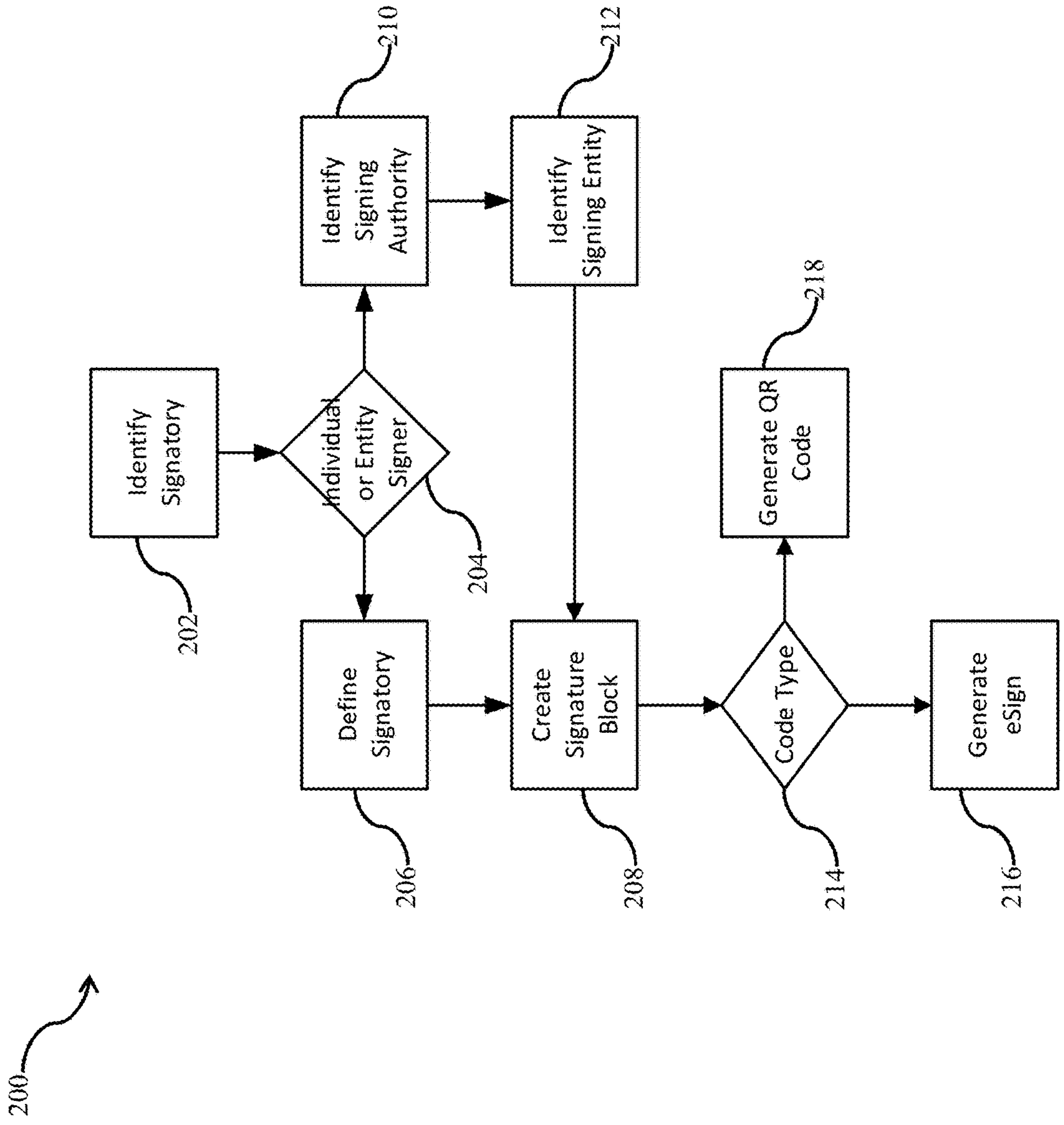
FIG. 2. shows a method for managing virtual signatures and electronic documents, according to at least one embodiment of the present disclosure.

Referring now to FIG. 2, it is shown a method for signature block creation, generally indicated at 200, according to at least one embodiment of the present disclosure. The method 200 begins at step 202 by identifying a signatory. In at least one embodiment of the present disclosure, each document requires an applicable signatory. It will be appreciated that a signatory may sign in his/her individual capacity, or on behalf of an entity. By way of an example, an officer of an entity may sign in his/her official capacity (e.g. as a chief executive officer), or in his/her individual capacity. It will be appreciated that an individual may serve a "dual-purpose" whereby an individual is designated as a signatory in his/her official capacity, and also in his/her individual capacity, or some other capacity.

Figure 2A:
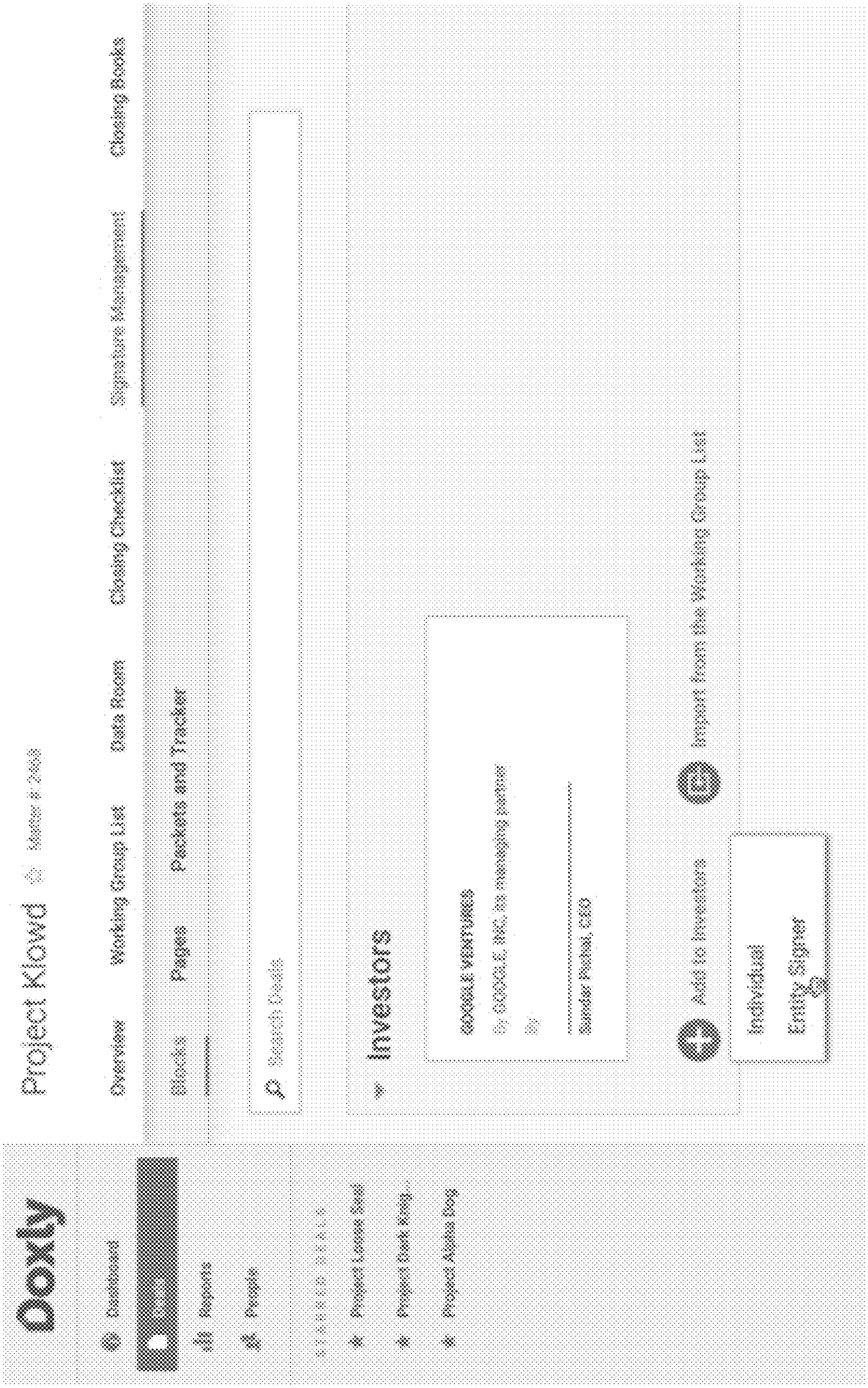
FIG. 2A displays a screenshot of an application generated through execution of the methods described herein and/or use of the systems described herein.

In at least one embodiment of the present disclosure, the method 200 includes step 202 where a signatory's signing capacity is determined. If the signatory is an individual signatory, the method 200 proceeds to step 206; otherwise, if the signatory is signing on behalf of an entity (i.e. an entity signer), the method 200 proceeds to step 210. For example, as shown in FIG. 2A, a user may be given the option to selectably choose (via the client device 110) between an "Individual" signatory, and an "Entity Signer."

Figure 2B:
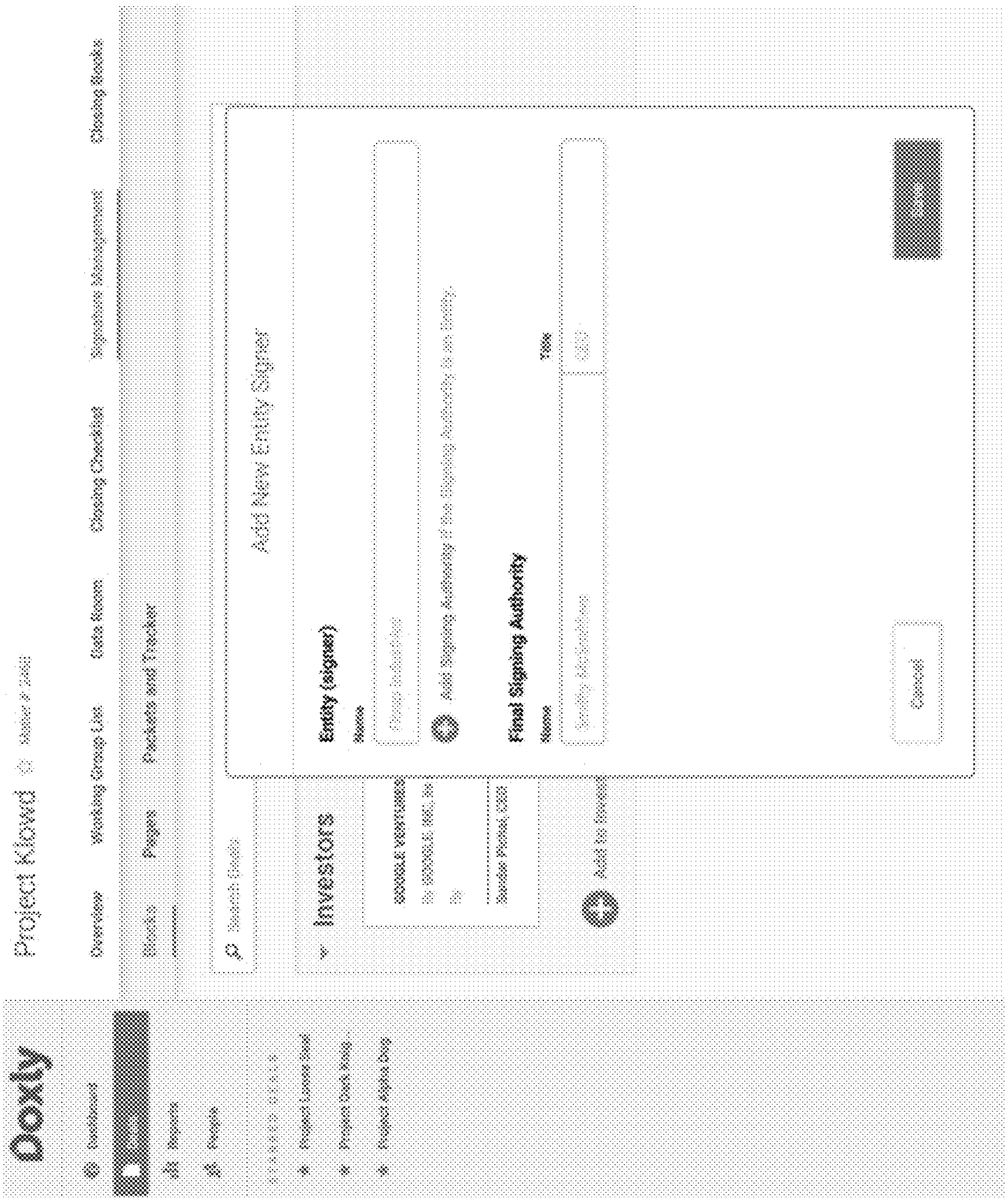
FIG. 2B displays a screenshot of an application generated through execution of the methods described herein and/or use of the systems described herein.

In at least one embodiment of the present disclosure, signing authority is defined at step 210. In step 210, the server 120 is configured to use information from database 130 to generate signatory information, based at least in part on predefined signatories. For example, as shown in FIG. 2B, a user (via the client device 110) may define the name of the entity on behalf of which the signatory is singing, and further define the signing authority of the signatory. It will be appreciated that the signing authority includes specific designations, such as, chief executive officer, managing partner, and the like. It will be further appreciated that the signing authority may be a mandatory requisite when selecting an entity signer. In at least one embodiment of the present disclosure, the server 120 is configured to retrieve information from third party database 150 to supplement signatory and singing authority information. By way of an example, a third party database 150 may include LinkedIn®, which may be operably accessed to provide signing authority for an entity signer. Alternatively, a signatory could be identified based at least in part on signing authority information transmitted and retrieved from LinkedIn (i.e. the third party database 150), where such signatory information was not already pre-defined.

Figure 2C:
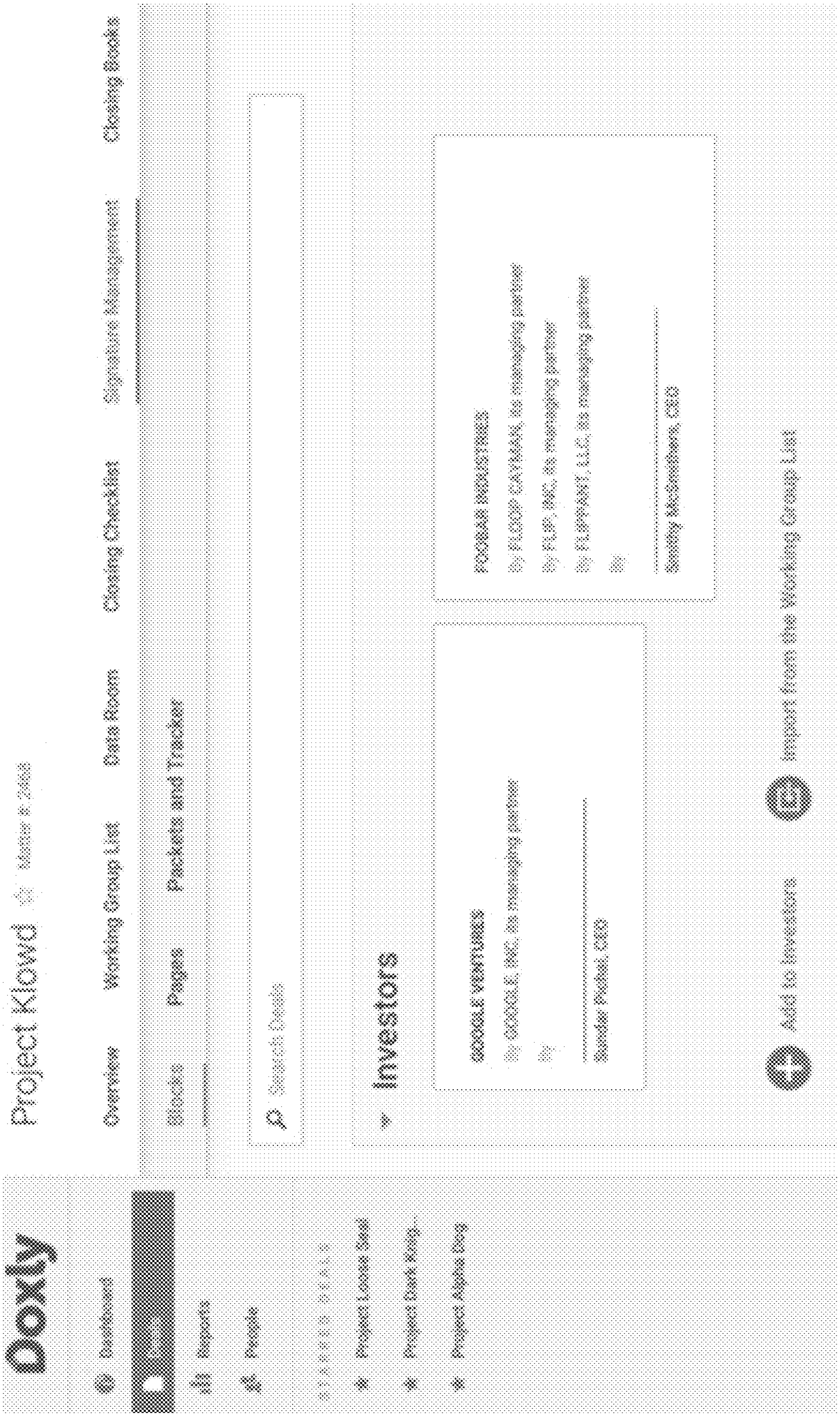
FIG. 2C displays a screenshot of an application generated through execution of the methods described herein and/or use of the systems described herein.

In at least one embodiment of the present disclosure, the singing entity is identified at step 212. By way of an example, a signatory may serve a plurality of roles whereby the signatory has signing authority over a plurality of entities, as stored in database 130, or received from third party database 150. In an exemplary embodiment shown in FIG. 2C, the entity "FOOBAR INDUSTRIES" includes a plurality of sub-entities whereby its signatory (i.e. Smithy McSmithers) serves as CEO. It will be appreciated that signing entity information may be customizably defined via server 120 and stored in database 130, or may be retrieved from third party database 150.

In at least one embodiment of the present disclosure, if a signatory is identified as signing in his/her individual capacity at step 204, the method proceeds to step 206, where the signatory is defined. Referring back to FIG. 2A, a user (via the client device 110) may selectably choose "Individual" signer.

The method 200 then proceeds to step 208, where at least one signature block is created. In at least one embodiment of the present disclosure, a signature block includes the name of the signatory, and the signing authority of the signatory. It will be appreciated that the signature block may be configured to include other characteristics of the signatory such as, personal identifiable information, and the like. In at least one embodiment of the present disclosure, the signature blocks include digital or electronic signature mechanisms, such as, DocuSign®, and the like. It will be appreciated that signature blocks construct embedded document identifiers to automatically track signature pages, and the corresponding signature blocks. It will be appreciated that the signature blocks allow for easier tracking and navigation of signatories and signature pages, as further disclosed herein.

In at least one embodiment of the present disclosure, the method 200 then proceeds to step 214 where a verification code type is selected. It will be appreciated that the signature block may include a unique quick-response (QR) code or other unique document identifiers for situations where electronic signing mechanisms are not viable. If an electronic signature code is selected, the method 200 proceeds to step 216; otherwise, if a QR code is selected, the method 200 proceeds to step 218.

In at least one embodiment of the present disclosure, an electronic signature code is generated at step 216. The signature block is assigned to a document as disclosed above. In at least one embodiment of the present disclosure, the server 120 generates a signature page database object, for the signature block as assigned to a document, and save the signature page database object to database 130. In at least one embodiment of the present disclosure, the server 120 generates an electronic signature code key for the signature page database object. In at least one embodiment of the present disclosure, the electronic signature code key is generated by a random number generator. It will be appreciated that the electronic signature code key may be generated by any means known to one having ordinary skill in the art, to maximize entropy of the electronic signature code key, and reduce collision between different electronic signature code key generated for various signature pages. It will be further appreciated that the code key may be of any size, including, but not limited to, 128 bits, 256 bits, 512 bits, 1024 bits, 2048 bits, and the like.

In at least one embodiment of the present disclosure, the electronic signature code key is embedded into each signature page, whereby the signature page is converted to PDF, and transmitted to the signatory as further disclosed herein.

In at least one embodiment of the present disclosure, a QR code is generated at step 218. The signature block is assigned to a document as disclosed above. In at least one embodiment of the present disclosure, the server 120 generates a signature page database object, for the signature block as assigned to a document, and save the signature page database object to database 130. In at least one embodiment of the present disclosure, a hypertext markup language (HTML) file is generated by the server 120, the HTML page corresponding to the signature page database object. The server 120 further generates a code key for the signature page database object. In at least one embodiment of the present disclosure, the code key is generated by a random number generator comprising of four (4) group of four-digit random number (e.g. xxxx-xxxx-xxxx-xxxx). It will be appreciated that the code key may be generated by any means known to one having ordinary skill in the art, to maximize entropy of the code key, and reduce collision between different code keys generated for various signature pages. It will be further appreciated that the code key may be of any size, including, but not limited to, 128 bits, 256 bits, 512 bits, 1024 bits, 2048 bits, and the like.

In at least one embodiment of the present disclosure, a QR code is generated based at least in part on the code key. In an exemplary embodiment a QR code may be generated using Barby, at level 'q' or 'h,' and size 2. It will be appreciated that a QR code may be generated by any means known to one having ordinary skill in the art.

In at least one embodiment of the present disclosure, the QR code is placed within the HTML page. It will be appreciated that the QR code may be placed in a location of the HTML page such that it does not overlap with, obstructs, or is obstructed by any existing content in the HTML page. In an exemplary embodiment, the QR code may be placed in the bottom right of the HTML page. Continuing with such an embodiment, the HTML page is converted to a portable document format (PDF), incorporating the QR code.

In at least one embodiment of the present disclosure all signature pages incorporating a signature block with a QR code may be merged into a single PDF packet, which single PDF packet may be distributed for signature, as further disclosed herein.

Figure 3:
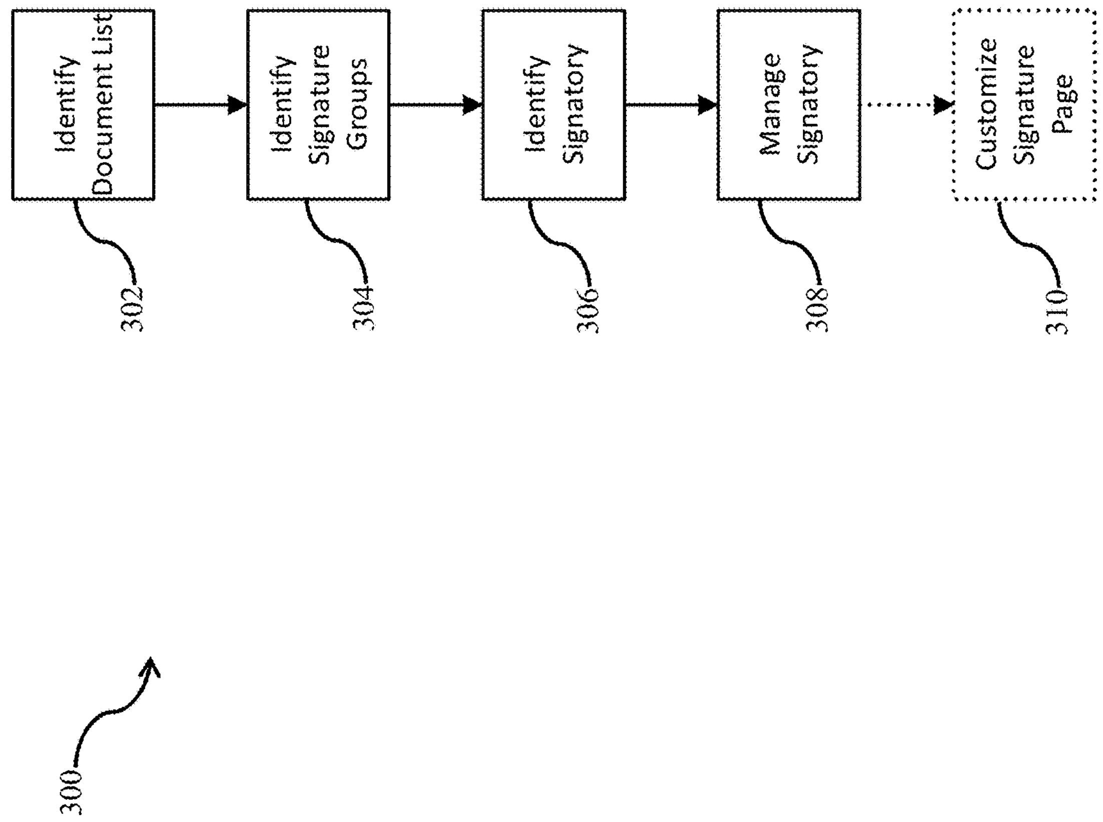
FIG. 3. shows a method for managing signatories, according to at least one embodiment of the present disclosure.

Referring now to FIG. 3, it is shown a method 300 for managing signatory pages, according to at least one embodiment of the present disclosure. The method 300 includes identifying a document list at step 302, identifying signature groups at step 304, identifying signatories in step 306, managing signatories in step 308, and customizing signature pages in step 310.

Figure 3A:
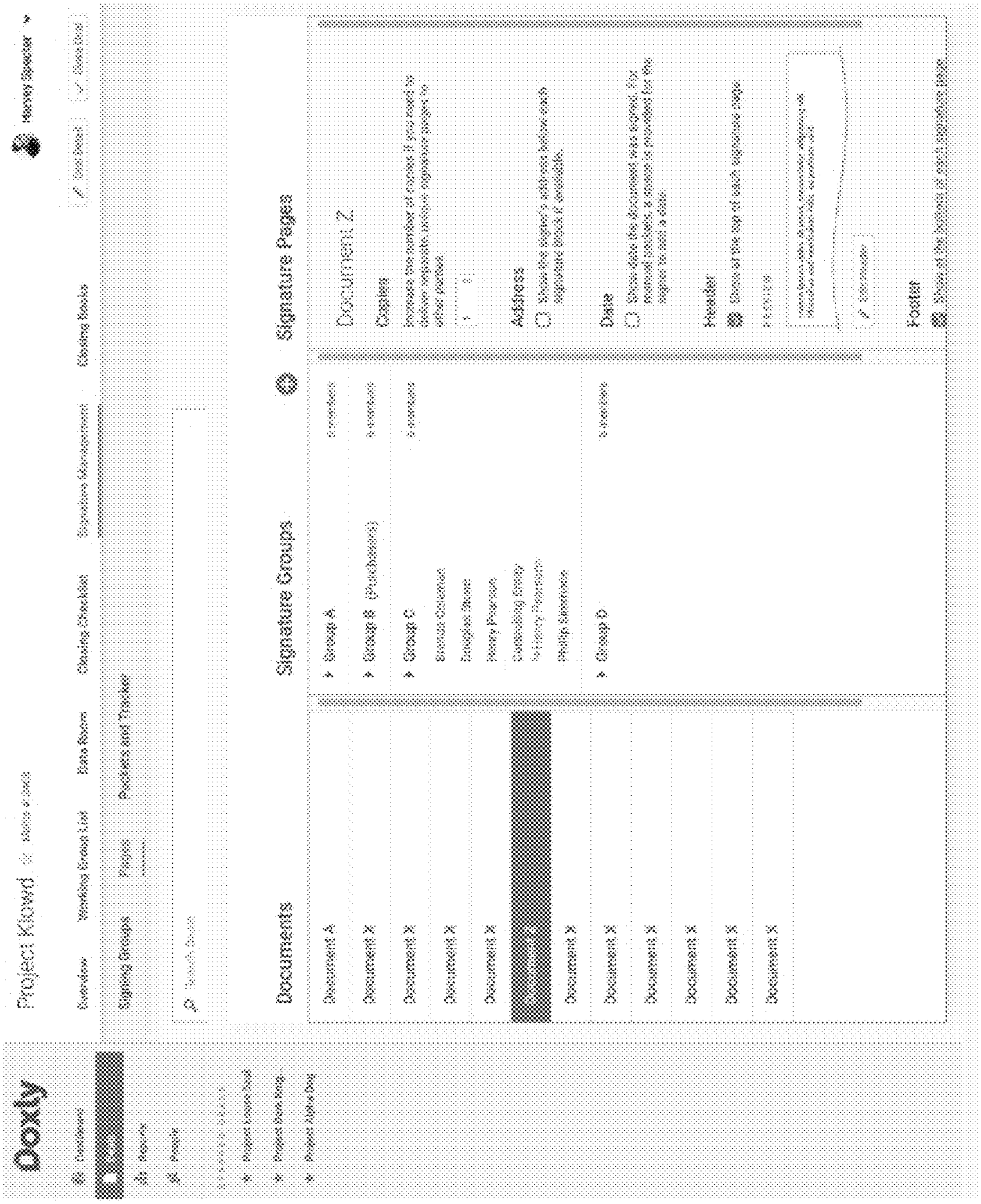
FIG. 3A displays a screenshot of an application generated through execution of the methods described herein and/or use of the systems described herein.

In at least one embodiment of the present disclosure, a document list is identified at step 302. A user (via client device 110) may be presented with a plurality of documents that comprise a transaction's documents, which documents are retrievably stored in database 130. For example, as shown in FIG. 3A, the user may be presented with a listing of documents available for review. It will be appreciated that each of the documents may be selectable via the client device 110.

In at least one embodiment of the present disclosure, the method 300 proceeds to step 304, upon selecting a particular document. At step 304, signature groups are identified. In at least one embodiment of the present disclosure, each of the plurality of documents may include a plurality of signature groups retrievably stored in database 130. The each of the plurality of signature group may include a plurality of signatories, which signature groups may be defined as further disclosed below. For example, referring to FIG. 3A, a pane comprising the each of a plurality of exemplary signature groups (i.e. Group A, Group B, Group C, and Group D) is shown. In at least one embodiment of the present disclosure, the each of the plurality of signature groups may be operably selected via the client device 110.

In at least one embodiment of the present disclosure, signature groups may be defined by a user, or pre-populated. For example, a signature group may include the board of directors of an entity, and which signature group may be populated with a plurality of signatories (i.e. the board members), and in accordance with their signing authority (i.e. as members of the board). In at least one embodiment of the present disclosure, signature groups may be uniformly applied to a plurality of transaction documents. It will be appreciated that this increases efficiency because individual signatories do not have to be applied and re-applied to every single document applicable under a signature group.

In at least one embodiment of the present disclosure, the method 300 proceeds to step 306, upon operably selecting a signature group. At step 306, at least one signatory (and any plurality of signatories) is displayed. For example, referring to FIG. 3A a plurality of signatories (e.g. Brenda Coleman, Douglas Stone, etc.) is shown in Group C. It will be appreciated that each of the plurality of signatories may be operably selected via the client device 110. In at least one embodiment of the present disclosure, a signatory may be selectably excluded from a signature group, including on a document-by-document basis, whereby the excluded signatory does not have any documents included in his/her signature package.

In at least one embodiment of the present disclosure, the method 300 proceeds to step 308, upon operably selecting a signatory. At step 308, a plurality of signature pages may be displayed, which signature pages need to be signed by the selected signatory.

In at least one embodiment of the present disclosure, the method 300 proceeds to step 308, where the each of the signatories may be managed. At step 308, a signatory may be selectably added, or excluded from a signature group. In at least one embodiment of the present disclosure, a signatory may be excluded if a signature page from a document is not configured for the signatory. By way of an example, a signatory may be configured as part of signature group Group A, however, the signatory may only have to sign a subset of documents applicable to the signature group Group A, compared to other signatory members of Group A.

In at least one embodiment of the present disclosure, the method 300 proceeds to step 310, where signature pages may by customized. In at least one embodiment of the present disclosure, a plurality of customizable signature page fields, such as, an address field, a date field, a header, footer, and the like, are provided. It will be appreciated that each of the customizable signature fields may be individually configurable and selectable for each of the signatories. For example, as shown in FIG. 3A, a header may be customizably edited and specific to a signatory.

Figure 4:
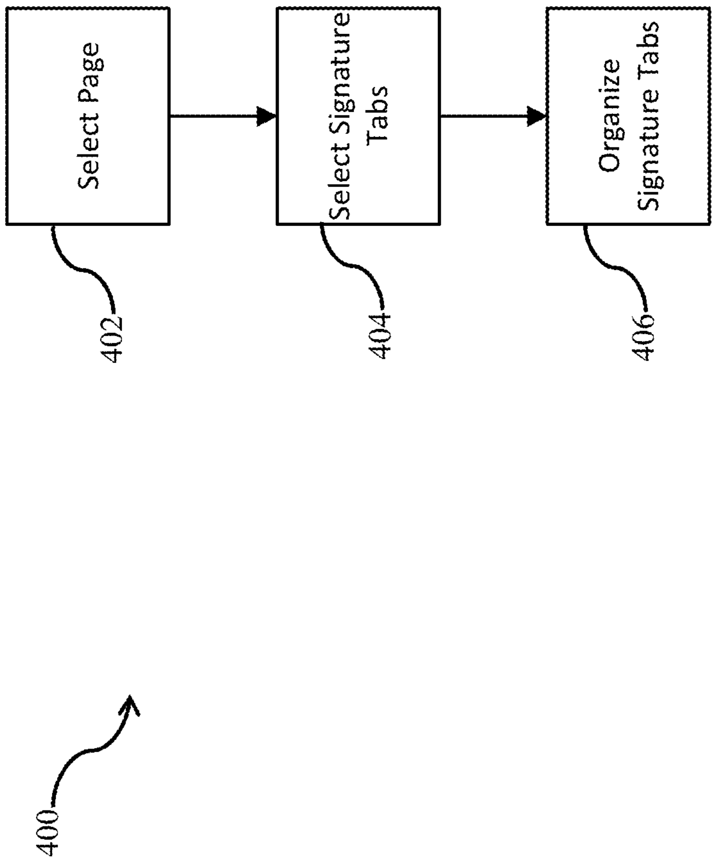
FIG. 4. shows a method for organizing signature tabs, according to at least one embodiment of the present disclosure.

Referring now to FIG. 4, it is shown a method 400 for customizing signature pages, according to at least one embodiment of the present disclosure. The method 400 includes step 402 of selecting a page, step 404 of selecting signature tabs, and step 406 of organizing signature tabs.

Figure 4A:
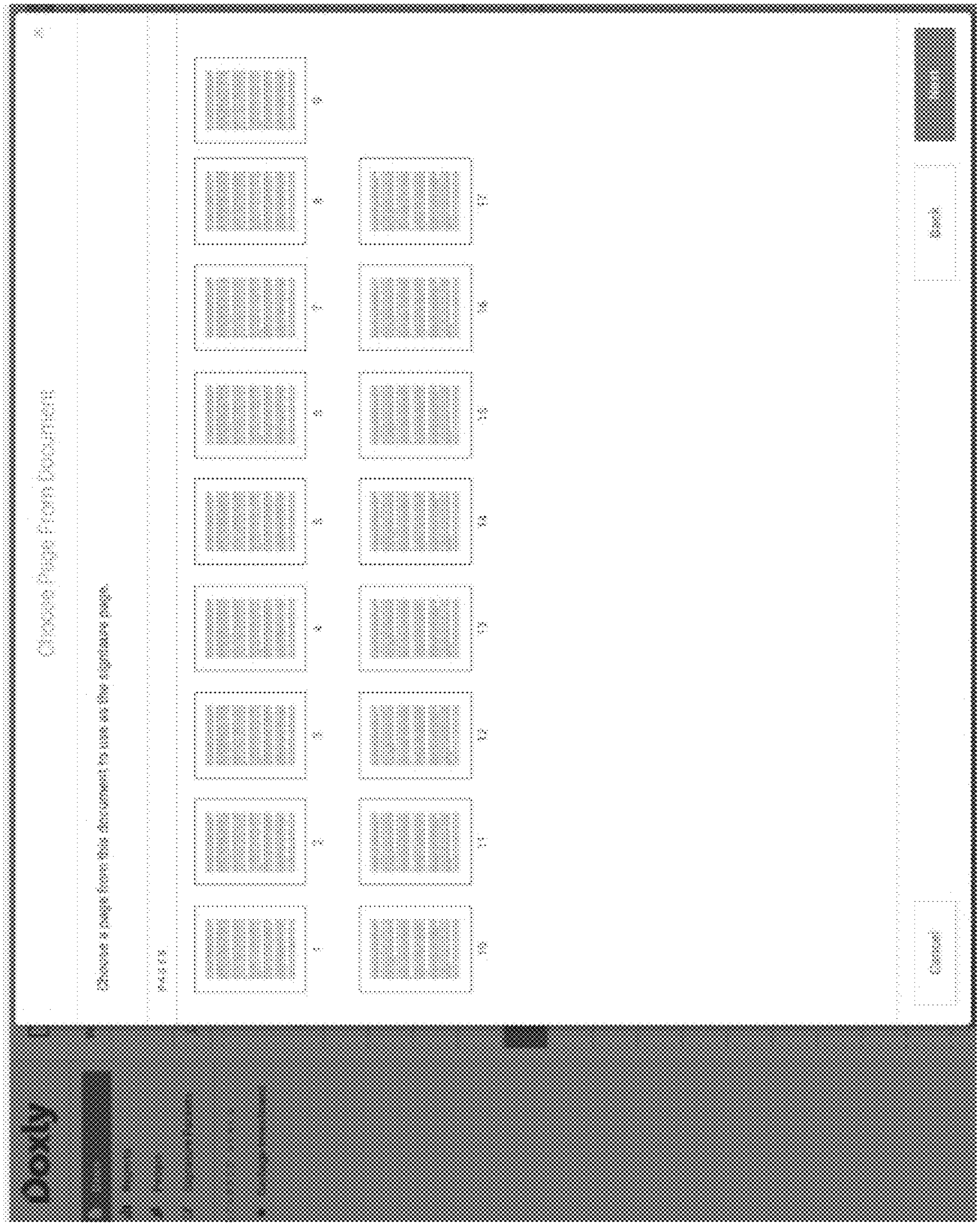
FIG. 4A displays a screenshot of an application generated through execution of the methods described herein and/or use of the systems described herein.

In at least one embodiment of the present disclosure, a signature page is selected at step 402. The signature page (or plurality of signature pages) is retrievably stored in database 130. In at least one embodiment of the present disclosure, a document may include a plurality of signature pages, and the each of the document pages may be selectably displayed. A user (via client device 110) may select a particular document page. For example, referring to FIG. 4A, there is shown a thumbnail of a plurality of pages in a document.

Figure 4B:
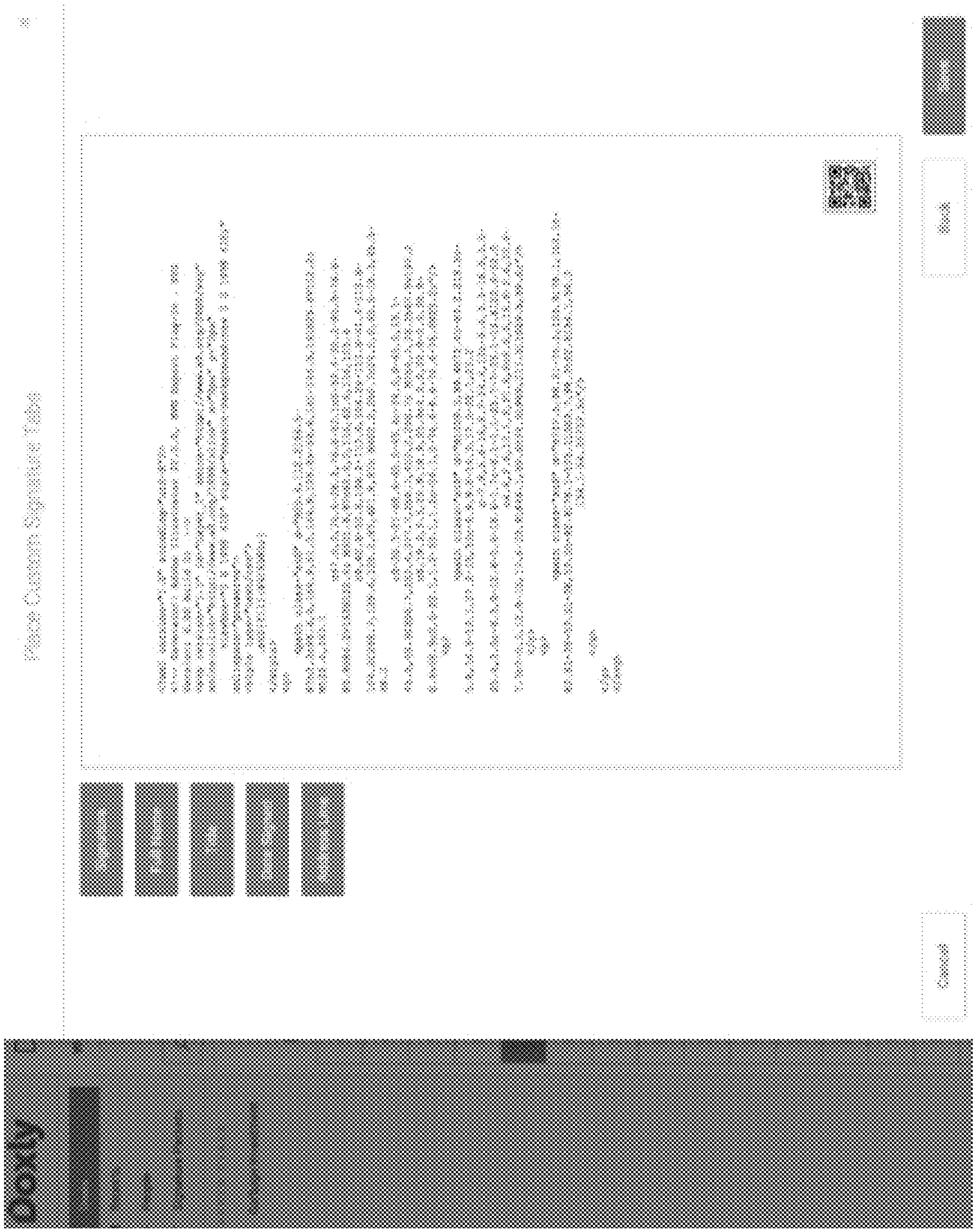
FIG. 4B displays a screenshot of an application generated through execution of the methods described herein and/or use of the systems described herein.

In at least one embodiment of the present disclosure, the method 400 proceeds to step 404, when a page is selected. At step 404, a plurality of signature tabs is configurably provided for insertion into the selected page. For example, referring to FIG. 4B, it is shown a signature page and a plurality of signature tabs for insertion into the signature page. It will be appreciated that the plurality of signature tabs may be configurable to include any selection of tabs, well known to one having ordinary skill in the art.

In at least one embodiment of the present disclosure, the method 400 proceeds to step 406, upon selection of a signature tab. At step 406, a user (via the client device 110) may configurably move and organize the tabs to create tab sections on the signature page. In at least one embodiment of the present disclosure, the each of the plurality of signature tabs may have pre-defined page locations whereby the each of the plurality of signature tabs are operably inserted into said location upon selection. It will be appreciated that the pre-defined locations may include pixel based measurements, or the like, and accommodate varying paper sizes and orientations, well known to one having ordinary skill in the art.

In at least one embodiment of the present disclosure, the each of the plurality of signature tabs may be automatically inserted into a signature page and integrated with digital or electronic signature mechanisms, such as, DocuSign®, and the like. It will be appreciated that the automated signature tabs construct embedded document identifiers to automatically track signature pages, and the corresponding signature blocks.

In at least one embodiment of the present disclosure, the automated signature tabs provide for embedded singing of the signature pages. By way of an example, the server 120 is configured to automatically create signature tabs to generate unique signing identifiers for each recipient-signatory and corresponding signature page (i.e. a unique signing identifier is generated for each signature page based on the recipient-signatory). It will be appreciated that embedded signatures allow for easier tracking and navigation of signatories and signature pages.

In at least one embodiment of the present disclosure, the embedded document identifiers may include a quick-response (QR) code. It will be appreciated that a QR code may be substituted for situations where electronic signing mechanisms are not viable. It will be further appreciated that the QR code is uniquely identifiable for each document signature page.

Figure 5:
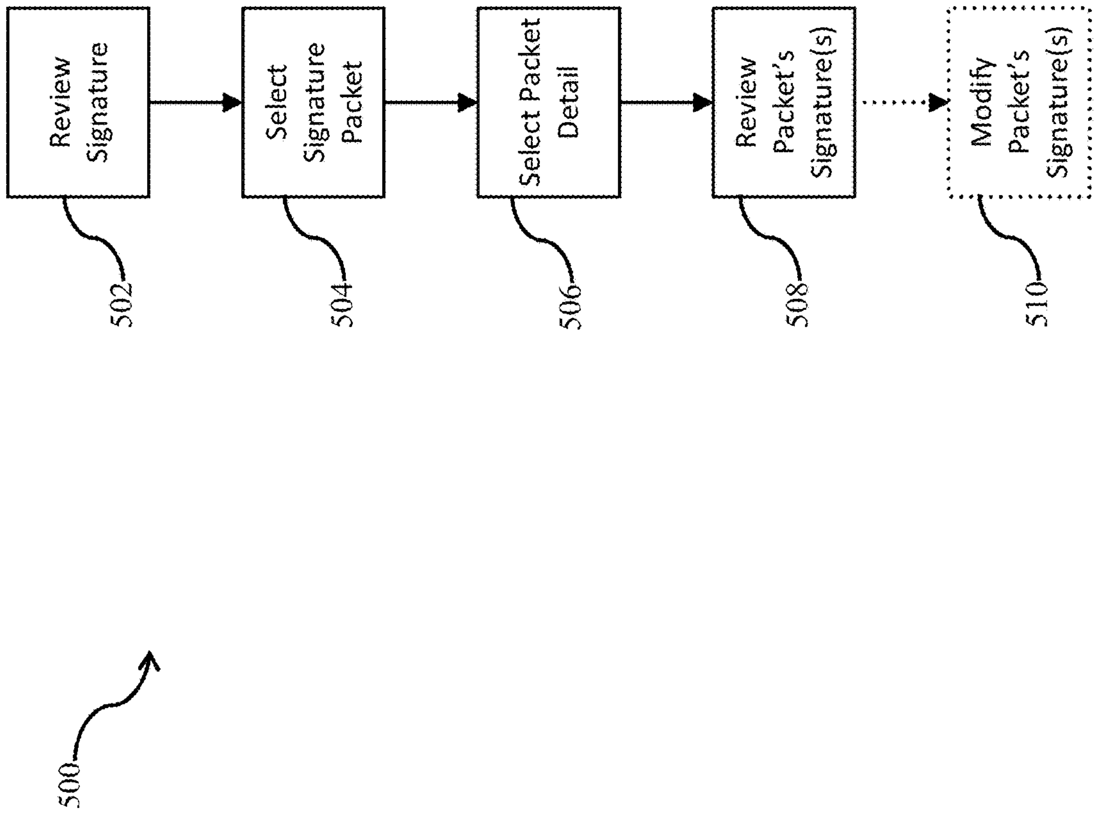
FIG. 5. shows a method for managing signatories, according to at least one embodiment of the present disclosure.

Referring now to FIG. 5, it is shown a method 500 for sending signatures, according to at least one embodiment of the present disclosure. The method 500 includes step 502 of reviewing signatures, step 504 of selecting a signature packet, step 506 of selecting packet details, step 508 of reviewing packet signatures, and step 510 of modifying packet signatures.

Figure 5A:
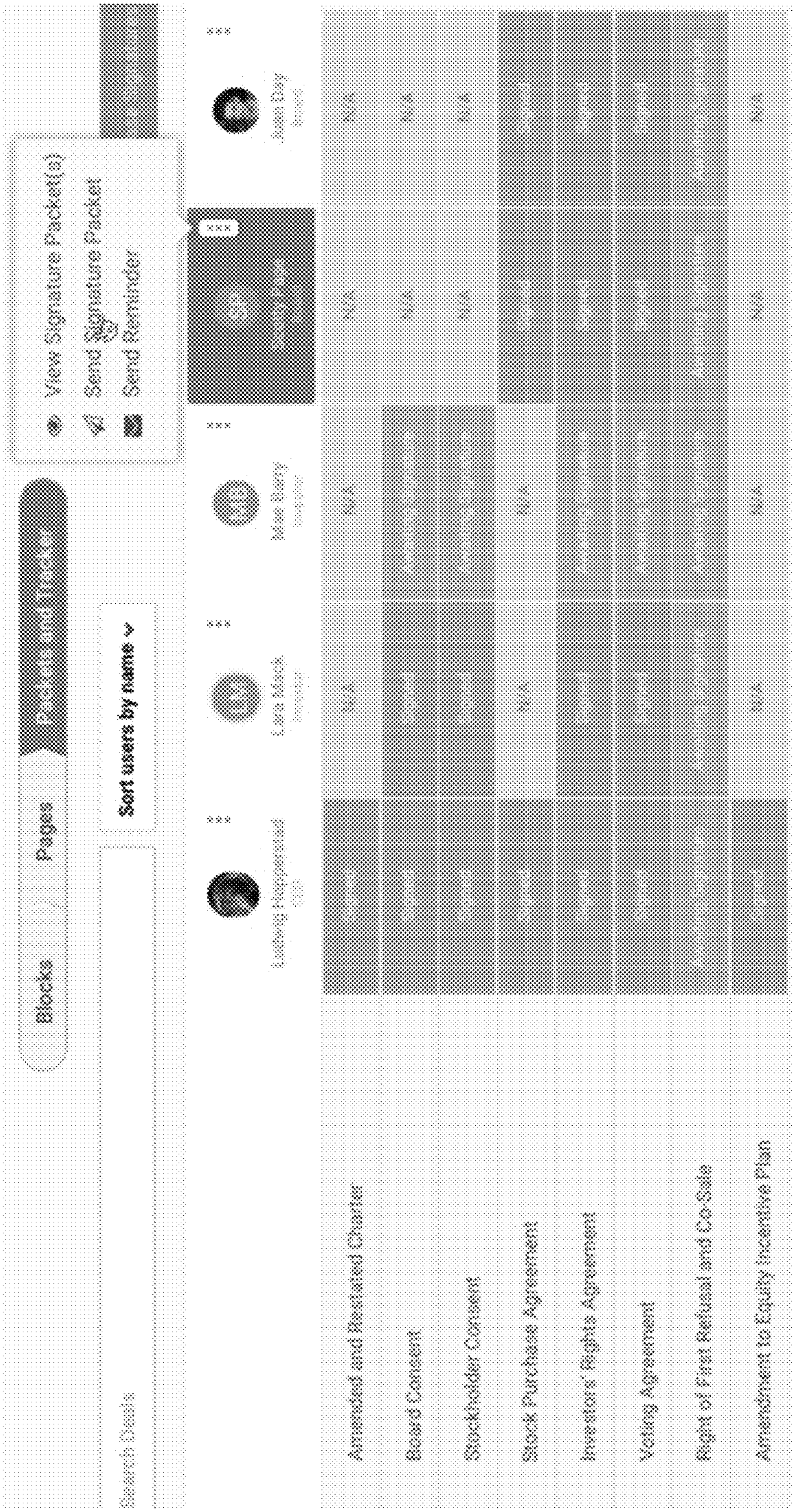
FIG. 5A displays a screenshot of an application generated through execution of the methods described herein and/or use of the systems described herein.

In at least one embodiment of the present disclosure, a plurality of signature statuses are reviewed at step 502. The plurality of signature statuses is retrieved by the server 120 from database 130. In at least one embodiment of the present disclosure, the each of the plurality of signature statuses corresponds to the status of documents for each of a plurality of signatories. For example, referring to FIG. 5A, it is shown a matrix dashboard of signatories and documents that require the applicable signatory's signature. In the exemplary embodiment shown in FIG. 5A, the "Amended and Restated Charter" requires the signature of Ludwig Hopperstad; and the "Board Consent" document requires the signatures of Ludwig Hopperstad, Lara Mack, and Mae Barry. As shown in FIG. 5A, the Board Consent document is still awaiting signature by Mae Barry; while Ludwig Hopperstad and Lara Mack have signed the Board Consent document.

In at least one embodiment of the present disclosure, the matrix dashboard is configured to display a status, wherein the status consists of "Signed," "Awaiting Signature" or "Not Applicable." It will be appreciated that the matrix dashboard is also color coded for each of the statuses to allow easier readability of information.

Figure 5B:
FIG. 5B displays a screenshot of an application generated through execution of the methods described herein and/or use of the systems described herein.

In at least one embodiment of the present disclosure, the method 500 proceeds to step 504 where a signature packet is selected. For example, referring to FIG. 5B, a plurality of signature packets is shown for a particular signatory (i.e. Sundar). In at least one embodiment of the present disclosure, a date and time stamp is shown for the each of the plurality of signature packets, indicative of a date and time when the signature packet was sent for signature, as further disclosed herein.

In at least one embodiment of the present disclosure, the method 500 proceeds to step 506, when one signature packet of the plurality of signature packets is selected. When one signature packet is selected, the documents included in the signature packet are displayed, as shown in FIG. 5C, according to an exemplary embodiment of the present disclosure. In at least one embodiment of the present disclosure, a date and time stamp is collected by the server 120 and stored in database 130, every time the signature packet is sent or is signed and returned. It will be appreciated that a signature packet may include documents that do not need a signature.

In at least one embodiment of the present disclosure, a packet's signatures may be reviewed at step 508. By way of an example, a user may selectably choose a packet and/or the documents in each of the packets to view the status of signatures. It will be appreciated that a packet and/or documents can be in a variety of statuses (e.g. signed, unsigned, or not applicable). It will be further appreciated that the status of all packets and signatures is viewable to easily and quickly ascertain whether all documents in the packet are signed, as appropriate.

In at least one embodiment of the present disclosure, the method 500 may proceed to step 510 where a packet's signatures may be modified. By way of an example, a packet and/or any documents therein may be voided or the signature requirement may be modified as desired by a user. It will be appreciated that any updates to any packet or documents will be retrievably saved to the database 130. In at least one embodiment of the present disclosure, when a packet is voided, it may be made inaccessible.

Figure 6:
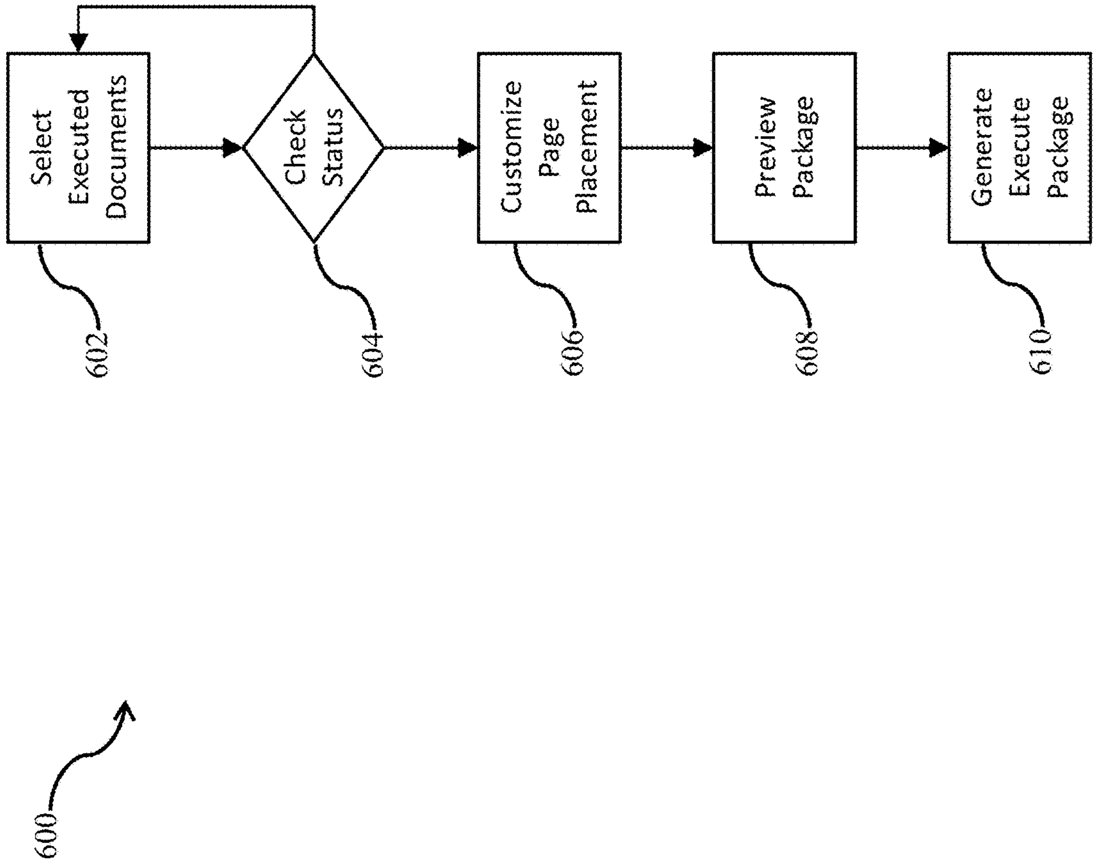
FIG. 6. shows a method for generating packets, according to at least one embodiment of the present disclosure.

Referring now to FIG. 6, it is shown a method 600 for generating execution packages, according to at least one embodiment of the present disclosure. The method 600 includes selecting executed documents at step 602, checking status at step 604, customizing page placement at step 606, generating a package preview at step 608, and generating an execution package at step 610.

In at least one embodiment of the present disclosure, documents are selected at step 602. As disclosed herein, a particular transaction may include a plurality of transaction documents, which transaction documents may need a signatory, and some of which may have been executed, while others may not. In at least one embodiment of the present disclosure, executed documents are segregated from non-executed documents. At step 602 of the method 600, each document's status is checked to confirm that it has been executed. If a document has been executed, the method proceeds to step 606; otherwise, the method reverts to step 602 to select only executed documents. It will be appreciated that any non-executed documents may be sent (or re-sent) for signature, as further disclosed herein.

Figure 6A:
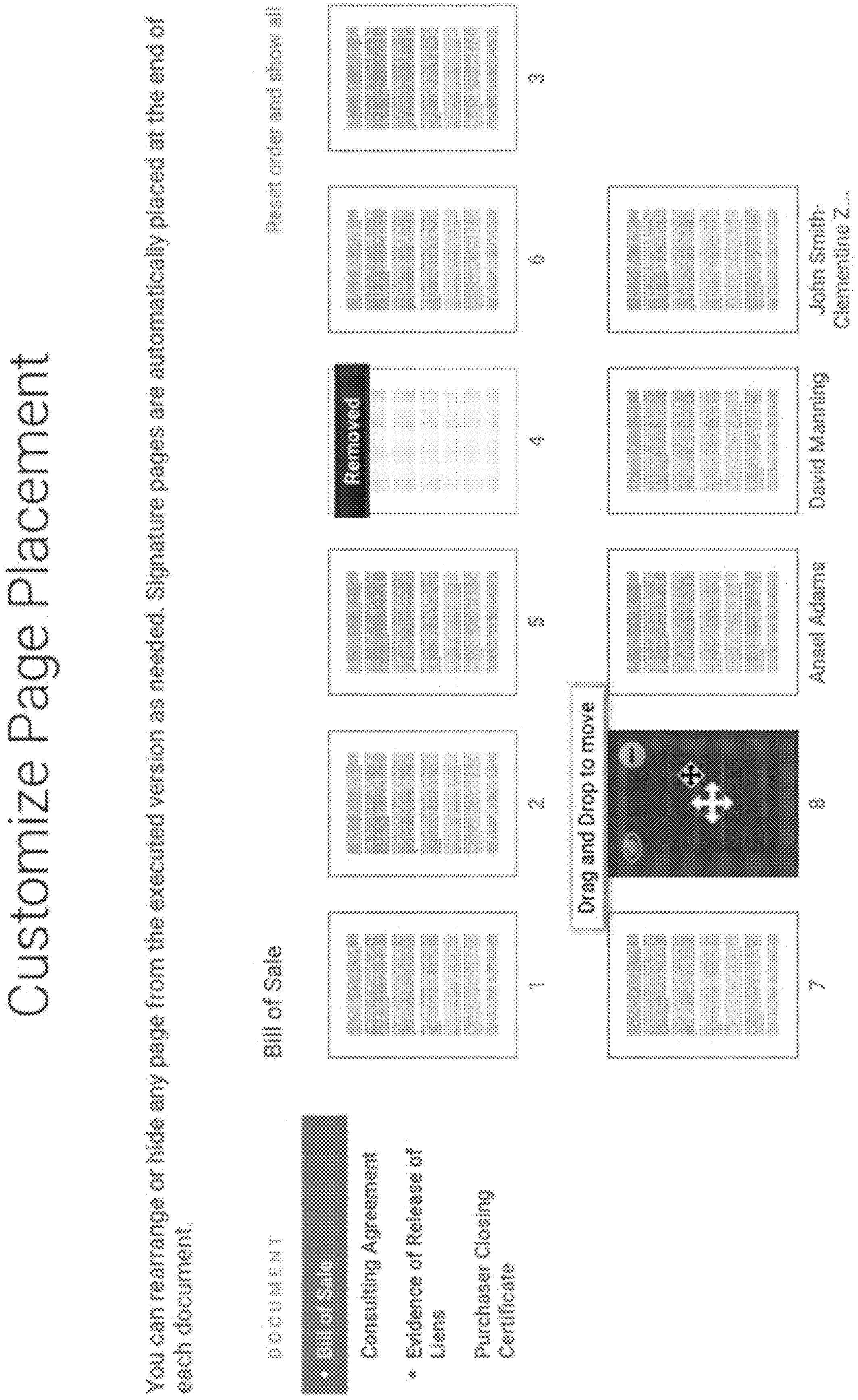
FIG. 6A displays a screenshot of an application generated through execution of the methods described herein and/or use of the systems described herein.

In at least one embodiment of the present disclosure, page placement may be customized at step 606. For example, referring to FIG. 6A, it is shown an exemplary embodiment of customizable page placement. In at least one embodiment of the present disclosure, the each of the pages of the document are displayed as thumbnails and are configured to be selectably moved to relocate the page's position within the document. It will be appreciated that the documents may include a default page layout that may be reverted to. In at least one embodiment of the present disclosure, pages may be moved, hidden, or deleted. Any modification to executed version(s) of a document will need to be confirmed to ensure that changes take effect. It will be appreciated that confirmation minimizes errors or accidental changes. Upon completion of page placement relocation (if any), the method 600 proceeds to step 608.

In at least one embodiment of the present disclosure, a package preview is generated at step 608. It will be appreciated that a user viewing the package preview (e.g. via client device 110) will be able to verify the final contents of a package before generating the package for transmission (e.g. to a signatory). After confirming the preview, the method 600 proceeds to step 610.

In at least one embodiment of the present disclosure, the executed package is generated at step 610. The executed package includes all documents that have executed signatures and combined into a final package. It will be appreciated that the executed package may be shared with entities or individuals (for example, by transmitting the executed package via network 140).

Figure 7:
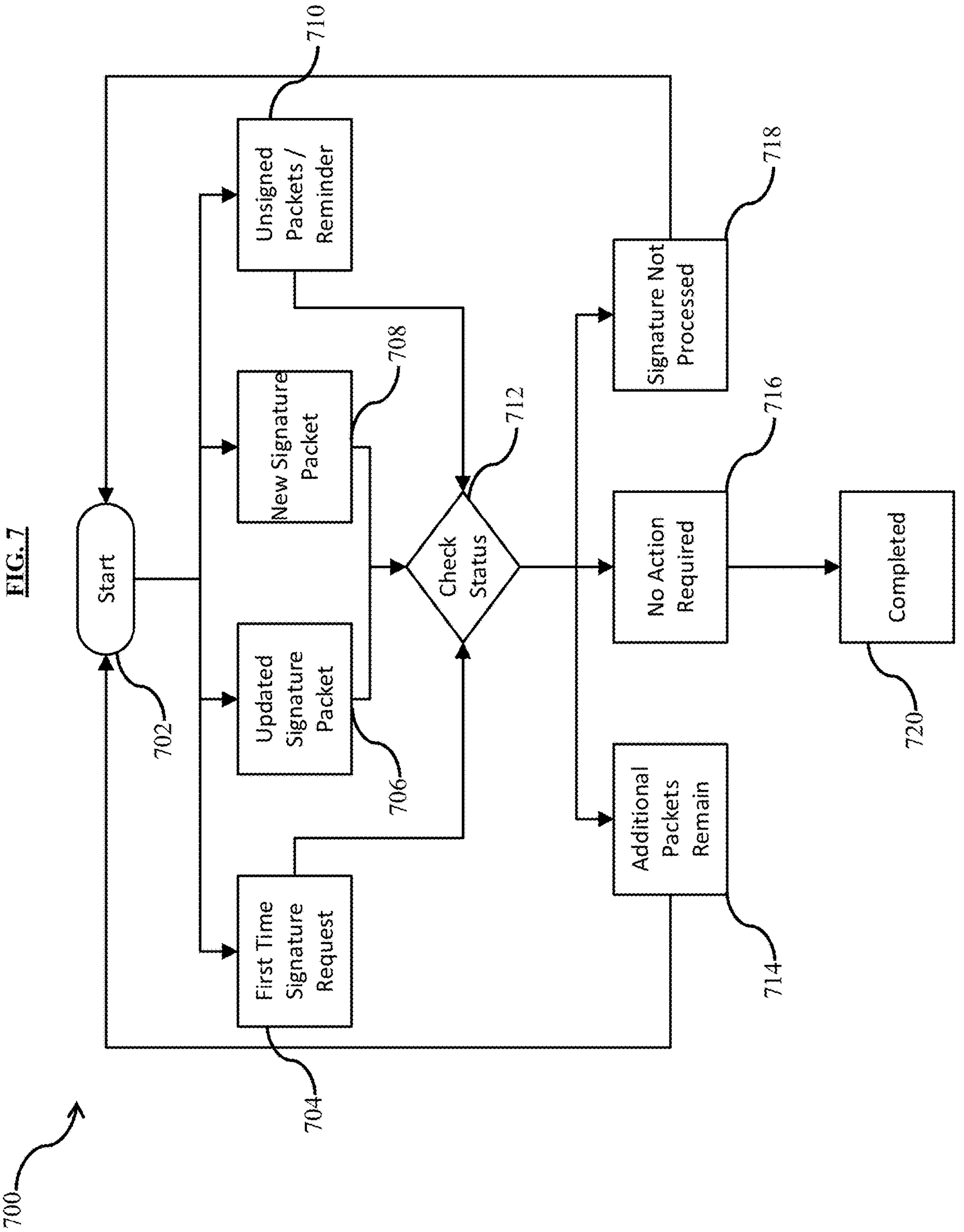
FIG. 7. shows a method for managing virtual signatures and electronic documents, according to at least one embodiment of the present disclosure.

Referring now to FIG. 7, it is shown a method 700 for obtaining signatures, according to at least one embodiment of the present disclosure. The method 700 includes starting the signature process at step 702, requesting first time signatures at step 704, updating signature packets at step 706, creating new signature packets at step 708, sending reminders at step 710, checking status at step 712, providing notice about remaining packets at step 714, taking no action at step 716, checking signature processing at step 718, and completing the method at step 720.

In at least one embodiment of the present disclosure, the method 700 begins at step 702 wherein a transaction project is selected from the database 130, which transaction project is requested for completion. It will be appreciated that transaction documents may be generated as further disclosed herein. The method then proceeds to step 704.

In at least one embodiment of the present disclosure, first time signature requests are managed at step 704. When a signature request is first contemplated, the recipient-signatory must have valid contact information in order to be able to receive the signature packet. In at least one embodiment of the present disclosure, the recipient-signatory's information may be retrieved from the database 130, from third party database 150, or populated by a user at the time of transmission of the signature request. The method then proceeds to step 712.

In at least one embodiment of the present disclosure, updated signature packets are managed at step 706. By way of an example, if a signature packet that was previously sent out, was subsequently modified, a new version of the packet may need to be re-sent to applicable recipient-signatories (e.g. via network 140). It will be appreciated that the server 120 may automatically send out any modified signature packets at the time of modification, or at a pre-defined time. In at least one embodiment of the present disclosure, a third party system (e.g. email, file share, social media, and the like) may be used to communicate with a signatory. The method then proceeds to step 712.

In at least one embodiment of the present disclosure, new signature packets are managed at step 706. By way of an example, packets in a transaction may change, or be added. When an entirely new packet of documents is created, the server 120 is configured generate a signature request to affected recipient-signatories. In at least one embodiment of the present disclosure, the server 120 is configured to automatically generate communications to affected recipient-signatories upon creation of new signature packets, or be configured to generate such communications at pre-defined times. The method then proceeds to step 712.

In at least one embodiment of the present disclosure, unsigned signature packets are managed at step 710. By way of an example, any previously dispatched signature packets are checked periodically (as further disclosed herein). In at least one embodiment of the present disclosure, the server 120 generates additional communications to recipient-signatories who have not signed and returned his/her packet. It will be appreciated that the server 120 is configured to automatically generate communications to affected recipient-signatories upon creation of new signature packets, or be configured generate such communications at pre-defined times. The method then proceeds to step 712.

In at least one embodiment of the present disclosure, packet statuses are checked at step 712. For any of the signature documents that are transmitted to a recipient-signatory, the status of the document is tracked to ensure that the transmitted documents are received with the applicable signatures. In at least one embodiment of the present disclosure, the server 120 is configured to receive electronic signature pages from signatories, via the network 140. The server 120 is configured to review embedded electronic signatures to track completion of signatures and receipt of signature pages. It will be appreciated that the server 120 may perform hash verifications, to confirm veracity and integrity of signature documents.

In at least one embodiment of the present disclosure, a QR code embedded document is processed to confirm signature. In at least one embodiment of the present disclosure, when a signatory uploads a PDF of a packet of signature pages to the server 120, the server 120 splits the PDF of the packet of signature pages into a plurality of individual signature pages using any means known to one having ordinary skill in the art. The server 120 converts the each of the plurality of individual signature pages into an image format (e.g. JPG).

In at least one embodiment of the present disclosure, the plurality of individual signature page images is scanned to read a QR code thereon. If a QR code was found, the server 120 retrieves a corresponding code key (see step 218) from the database 130. Continuing with the foregoing embodiment, the server 120 re-coverts the plurality of individual signature page images into PDFs, designates the corresponding signature packets as signed, whereby processing of the signature packet is complete.

In at least one embodiment of the present disclosure, if the QR code is not found, the each of the plurality of individual signature page images is manipulated and re-scanned to identify the QR code. It will be appreciated that the each of the plurality of individual signature page images may feature QR codes in different locations, or QR codes with poor visual clarity.

By way of an example, if the QR code was not found, the server 120 may crop the bottom right corner of a individual signature page image starting with a fixed width and continue to crop it eight times making the area smaller each time. Continuing with this example, the server 120 may then rescan the each cropped areas to identify a QR code. If the QR code was not found again, the server 120 reverts to the original individual signature page image, and crop the bottom left corner of individual signature page image, starting with a fixed width and continues to crop it eight times making the area smaller each time. Again, the server scans the individual cropped images to identify a QR code. If the server 120 does not identify a QR code, the server 120 reverts to the original individual signature page image, and performs the same foregoing steps at the top right corner of the individual signature page image, starting with a fixed width; or at the top left corner of the individual signature page image, starting with a fixed width.

Continuing with the above example, if the QR code is still not identified, the server 120 rotates the individual signature page image upside down and reruns the foregoing steps to identify the QR code.

Continuing with the above example, if the QR code is still not found, the server 120 reloads the individual signature page image with a lower resolution and blur and reruns the each of the foregoing steps. It will be appreciated that the server 120 is configured to perform additional image processing functions on the individual signature page image such as, lower resolution, blurring, rasterizing, reversing black and white colors, and the like.

In at least one embodiment of the present disclosure, if the QR code was not found, the method 700 proceeds to step 718.

In at least one embodiment of the present disclosure, the server 120 is configured to verify any electronic signatures embedded within the signature packets, when submitted by a signatory, to the server 120. It will be appreciated that the server 120 may rely on any means known to one having ordinary skill in the art, such as, DocuSign, and the like.

In at least one embodiment of the present disclosure, the server 120 may also analyze any signature tabs thereon, to confirm signing of the document by the signatory. The method 700 then moves to one of steps 714, 716, or 718, depending on the result of the status check.

In at least one embodiment of the present disclosure, any additional remaining packets are determined at step 714. For example, if signature pages have not been received from recipient-signatories, the method loops back to step 702. In at least one embodiment of the present disclosure, any document where a signature is not processed, is managed at step 718. By way of an example, a failure in processing of signatures can arise if there is an error in the embedded document identifier, or the received copy of the signature page is illegible. In such exemplary situations, the method 700 loops back to step 702 whereby the server 120 is configured to re-perform the necessary actions, as disclosed above.

If all signature packets are properly signed, and received, no action is needed at step 716. In at least one embodiment of the present disclosure, the server 120 is configured to update the matrix dashboard accordingly, and save the statuses in database 130. It will be further appreciated that the server 120 is configured to update the statutes of the matrix dashboard in real time.

In at least one embodiment of the present disclosure, the server 120 is further configured to perform version tracking of any transaction packets and the underlying documents. For each transaction packet and the underlying documents, the server 120 verifies a hash of the file to identify any changes base at least in part on the change in hash values. It will be appreciated that the provision of change tracking allows for better oversight of changes in transactions. In at least one embodiment of the present disclosure, any changes to transaction packets or underlying documents will trigger a re-send of any previously sent transaction packets, as disclosed above.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

We claim:

1. A computerized method for managing virtual signatures and electronic documents, the method comprising:

receiving a transaction engagement at a server, the transaction engagement having a plurality of transaction documents requiring signatures;

generating at the server a plurality of signature documents corresponding to the plurality of transaction documents of the transaction engagement, the plurality of signature documents being based at least in part on signatories of the plurality of transaction documents and signing authority of the signatories of the plurality of transaction documents, each signature document of the plurality of signature documents including at least one signature page, each signature page of the plurality of signature pages corresponding to at least one transaction document of the plurality of transaction documents;

automatically generating at the server electronic signature blocks for the plurality of signature pages, the electronic signature blocks being based at least in part on a signatory identifier and a signing authority, the electronic signature blocks identifying the signatory identifier and the signing authority, the electronic signature blocks including electronic signature codes and computer-readable visual unique quick-response codes for tracking respective signature pages;

embedding at the server the electronic signature blocks into respective signature pages;

creating at the server a plurality of execution packages, each execution package comprising a subset of the plurality of signature documents based on a specific signatory;

transmitting the plurality of execution packages from the server via a network for execution by the specific signatories;

receiving at the server at least one executed execution package of the plurality of execution packages;

scanning, by a scanner of the server, the visual unique quick-response code of the at least one executed execution package for any signature page not electronically signed within the at least one executed execution package;

converting into a desired format, by the server, images of signed pages from the at least one executed package; and verifying at the server the at least one executed execution package based on the electronic signature blocks of the signature pages.

2. The method of claim 1, further comprising tracking at the server statuses of the plurality of execution packages.

3. The method of claim 1, wherein one or more users configure the plurality of signature documents via the server.

4. The method of claim 1, wherein generating the signature blocks references a third party database to determine the signing authority.

5. A system for managing virtual signatures and electronic documents, the system comprising:

a database;

a server configured to:

receive a transaction engagement having a plurality of transaction documents requiring signatures;

generate a plurality of signature documents corresponding to the plurality of transaction documents of the transaction engagement, the plurality of signature documents being based at least in part on signatories of the plurality of transaction documents and signing authority of the signatories of the plurality of transaction documents, each signature document of the plurality of signature documents including at least one signature page, each signature page of the plurality of signature pages corresponding to at least one transaction document of the plurality of transaction documents;

automatically generate electronic signature blocks for the plurality of signature pages, the electronic signature blocks being based at least in part on a signatory identifier and a signing authority, the electronic signature blocks identifying the signatory identifier and the signing authority, the electronic signature blocks including electronic signature codes and computer-readable visual unique quick-response codes for tracking respective signature pages;

embed the electronic signature blocks into respective signature pages;

scanning, by a scanner of the server, the computer-readable visual unique quick-response codes;

converting into a desired format, images of signed pages from the plurality of signature pages; and create a plurality of execution packages, each execution package comprising a subset of the plurality of signature documents based on a specific signatory.

6. The system of claim 5, wherein the server is further configured to transmit one execution package of the plurality of execution packages to a client device associated with a signatory for execution of the one execution package by the signatory.

* * * * *